Feb. 16, 1971   J. N. KORAL   3,562,926
SELF-CORRECTIVE EDUCATIONAL DEVICE FOR TEACHING DENSITY
Filed April 11, 1968
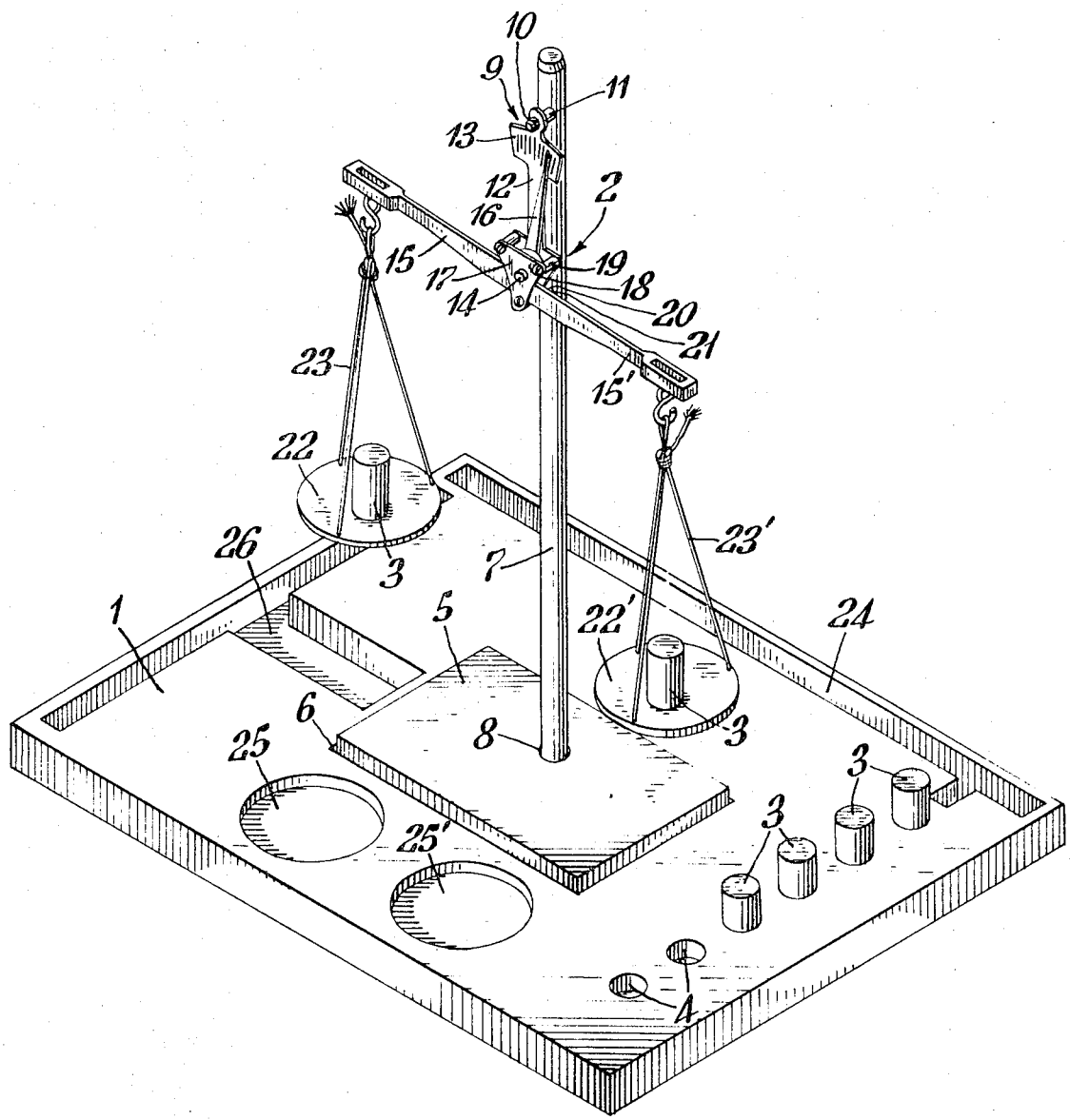
INVENTOR
Jerry N. Koral
BY
Lawrence J. Kastriner
ATTORNEY United States Patent Office 3,562,926
Patented Feb. 16, 1971

3,562,926
SELF-CORRECTIVE EDUCATIONAL DEVICE FOR TEACHING DENSITY
Jerry N. Koral, 34 Duke Drive, Stamford, Conn. 06905
Filed Apr. 11, 1968, Ser. No. 720,565
Int. Cl. G09b 23/06
U.S. Cl. 35—19
6 Claims

ABSTRACT OF THE DISCLOSURE

A scientific educational device for teaching preschool children the concept of density. The device consists of a balance, a set of equal sized solid objects of different density, such as equal sized bars of different metals, and a base board containing a set of spaces for the solid objects. The undersides of the objects and the spaces on the board are coded so that they will match only if the objects are placed in the spaces in the order of their densities. The coding enables the child to tell by himself whether he has correctly determined the order of the densities.

INTRODUCTION

This invention relates, in general, to a scientific educational device, and more specifically, to an educational aid or kit suitable for teaching pre-school children, i.e. children unable to read, the concept of density or relative weight of solids, and at the same time to introduce them to the "scientific method."

BACKGROUND

Though we live in a technologically dominated society, in which life is being changed at an ever increasing rate by scientific discoveries, science to the great majority of people remains a mystery. This lack of scientific knowledge—even among the supposedly educated—is due primarily to the gross neglect of scientific education, particularly at the elementary and high school levels. Increased scientific knowledge at all levels is therefore necessary if we are to provide our future social and intellectual leaders with a view of life which will enable them to relate better to our rapidly changing environment, and if we are to increase their capacity for understanding, creating and guiding the future. To leave today's children ignorant of science, is to leave tomorrow's adults unprepared for their time.

If fundamental scientific knowledge is to become widespread, teaching of science will have to be concerned not only with those who wish to make science their profession, but with all those who wish to acquire a better understanding of the world in which they live.

Because of the ever increasing importance that science plays in our daily lives, it is not surprising that the past decade has witnessed a virtual revolution in the teaching of science. This revolution began with up-dating of college level courses, and has since drifted down to the high school level. It is now beginning to be felt on the grade school level as well. If, however, any up-grading in the level of scientific education is to be truly extensive, as well as intensive, it must begin at the lowest levels of education; that is, at the lower elementary and, in fact, pre-school levels.

The need for beginning the educational process as early as possible has become accepted by educators and psychologists ever since it has become recognized that only the upper limits of a person's intelligence are fixed by his heredity and that the extent to which a person realizes his potetial intelligence depends on his environment—especially in his pre-school years.

Curiosity, the spur to all learning, causes children—beginning with infancy—to explore the world around them, to find out how things work, and to experiment. It is now known that young children are far more perceptive than had been thought; they observe closely and are highly receptive to knowledge. In fact, the most rapid growth in intelligence takes place not in school, but during the pre-school years. It has been estimated that two-thirds of a person's intelligence is formed by the age of six. Furthermore, the older a child becomes, the greater becomes the effort required to produce a given change in his intelligence. Consequently, what a child learns in his pre-school years largely determines his future achievement.

Everything said about the importance of early education in general, is equally true of scientific education. In addition, since basic attitudes toward subjects, as well as a child's pattern of dealing with learning problems are formed at a very early age, it becomes important to instill good attitudes toward science and correct approaches to problem solving from the start. Additionally, early comprehension of scientific fundamentals will provide more time for gaining greater proficiency.

In order to properly teach young children science, the educational technique must be pedagogically sound, scientifically correct, and physically safe.

A sound pedagogical approach makes the learning process an extension and an enrichment of the child's natural curiosity. Thus, it must give him free rein to explore, to test, and to become involved. A prime pedagogical requirement, therefore, is to gear the educational activity to an individual student rather than to a class; that is, have it involve a student-experiment rather than a teacher-demonstration. Individual activity, enabling newly acquired knowledge to be verified by personal experience, invariably produces greater personal involvement and thereby leads to greater understanding.

Another attribute of sound pedagogical technique is to have minimum adult interference in the learning process. This can best be accomplished by providing the student with educational material which itself does the teaching, rather than the teacher. Such educational material must be designed to enable the child to work at his own pace, and should contain several levels of progressively greater intellectual challenge so that the child can match his intelligence to the proper level of challenge. Since the child will inherently make the proper match between his ability and one of the available levels of intellectual challenge, it will result in satisfaction on the child's part because of his successful mastery of the challenge. This, in turn, will generate motivation, keeping the child's interest high in the learning process. Thus, educational material should require only minimum assistance from the teacher or parent, such as an explanation or demonstration of how the material is to be used. Still another requirement for achieving minimum adult interference is to have the educational material self-correcting so that the child is able to determine for himself whether he has properly carried out the experiment. This eliminates the need for correction, praise, or other interference from the teacher and fosters personal satisfaction as the reward for correct solution of a problem.

Lastly, the educational material must be appealing to the child and contain an element of play so that the learning process becomes a pleasurable activity.

The requirement of scientific accuracy necessitates that the concepts to be taught be geared to the child's level of understanding without, however, sacrificing truthfulness by oversimplification to the point of inaccuracy. Furthermore, the educational technique should involve the "scientific method" as an integral part thereof; that is, be rational, experimental and objective. The experiment should have a clear and simple relationship between the operational steps involved and the scientific concept it is intended to teach. Stress in such experiments should be placed on operations fundamental to the "scientific method," such as perceptual discrimination, measurement, trial and error experimentation, and deduction. Such a method will teach not simply a scientific fact, but also an awareness of the scientific approach. These objectives can best be achieved by providing children with self-contained units of appealing instructional material with which the child is able to involve himself in a process of inquiry, akin to the way science is actually done.

Teaching scientific concepts to young children presents several special problems. One of these is the child's inability to read and therefore to follow written instructions. Where chemistry is involved, a pressing problem is one of safety, requiring that all experiments be performed with non-toxic or harmless materials. This requirement places severe limitations on experimental work, since the vast majority of chemical compounds are too toxic— at least if swallowed—to permit their being handled by young children. Furthermore, any device used must be capable of manipulation by children. Finally the problem presented in an experimental environment must be capable of a child's solution. Thus, it is evident that to improve the content and process of scientific education necessitates the development of new educational materials satisfying all of the above requirements.

OBJECTS

It is the primary object of this invention to provide an educational device suitable for teaching young children, particularly pre-school children the scientific concept of density or relative weight in a manner which is scientifically correct, pedagogically sound, and physically safe.

It is another object of this invention to provide an educational device suitable for teaching young children the concept of density or relative weight in a manner which is experimental, which is geared to a child's level of understanding without sacrificing scientific truth, which makes the "scientific method" an integral part of the learning process, and with which the child can involve himself in a process of inquiry akin to the way science is actually done.

It is still another object of this invention to provide an educational device suitable for teaching young children the scientific concept of density or relative weight in a manner which is suited for personal involvement or individual activity, which requires minimum interference by teacher or parent, which is self-correcting, which contains several levels of progressively greater intellectual challenge, and which is appealing to a child's sense of curiosity and play.

SUMMARY OF THE INVENTION

The above and other objects which will become apparent from the disclosure to follow, are achieved by the present invention, which consists of an educational device suitable for the self-corrective teaching of the concept of density or the relative weight of solids comprising, in combination: (1) a balance, (2) a plurality of equal-sized solid objects of different density coded in such manner as to be hidden from the view of the person using the device and in such manner as to correspond with a matching space on a base, and (3) a base containing a plurality of spaces equal in number to the number of said solid objects, said spaces being arranged progressively in the order of the densities of said solid objects and coded to correspond with the appropriate solid object.

THE DRAWING

A better understanding of the invention may be gained by reference to the accompanying drawing in which the sole figure is a perspective view of a preferred embodiment of the present invention.

DETAILED DESCRIPTION OF THE INVENTION

Referring to the drawing, it can be seen that the device consists of a base board 1, a balance 2, and a set of solid cylinders 3 resting removably in a set of spaces or recesses 4. Each of the cylinders 3 is of the same size and shape as every other cylinder. However, each cylinder 3 is made of a different metal, and consequently each has a different density and weight. The preferred metals for the cylinders are lead, copper, nickel, iron, zinc, and aluminum. However, any stable, solid, non-toxic metal can be used.

Each of the cylinders 3 in the set is color coded on its bottom surface to match the color of one of the recesses 4. The color coding of the recesses 4 is arranged to be in the progressive order of the densities of the metal cylinders 3 so that the heaviest cylinder belongs at one end of the row, for example in the top recess, and the lightest cylinder belongs at the opposite end. The remaining cylinders in the set are arranged between the lightest and heaviest in order of their respective densities. In other words, when the color coding on the bottom face of each cylinder 3 matches the color coding of the recesses, the cylinders are arranged in the correct order of their respective densities.

Balance 2 is composed of several parts and intentionally made easily assembleable and disassembleable into its component parts in order to improve the child's manual dexterity, as well as to enable it to gain a deeper understanding of and involvement with the apparatus, such as is generally required of a scientist. Balance 2 is composed of a balance base 5 which rests in recess 6 located in the base board 1. Balance rod 7 is attached to balance base 5 by fitting slidably into drilled hole 8. Balance arm assembly 9 is hung by means of aperture 10 onto peg 11 which is attached to the upper end of rod 7. Aperture 10 is located in the upper portion of balance arm support member 12. The portion of support member 12 below aperture 10 consists of a scale 13. Pivot pin 14 is secured to the bottom portion of support member 12. Balance arms 15 and 15' which are integral with pointer 16 pivot freely about pivot pin 14 and are prevented from sliding off the pivot pin by plate 17. The latter is securely fastened to member 12 by screws 18. Plate 17 and support member 12 are separated by cylindrical spacers 19 which also serve as stops to prevent overswinging of balance arms 15 and 15'. Balance arm assembly 9 is maintained steady by an elongated screw 20 which fits snugly into groove 21 in rod 7. Two balance pans 22 and 22' are hung on the ends of balance arms 15 and 15' by string or thin wires 23 and 23'.

The balance 2 is easily disassembled into its component parts, which can be stored in recesses provided in base 1. Balance rod 7 is stored in recess 24, balance pans 22 and 22' are stored in recesses 25 and 25' respectively, and balance arm assembly 9 is stored in recess 26.

Although an equal arm beam balance is preferred, any kind of balance or scale can be used the choice depending upon the age and ability of the intended user, as well as upon the accuracy of weighing desired.

Base board 1 is preferably made of wood; however, it may be made of any other convenient material of construction, for example, metal or plastic. If a very inexpensive version of the invention is to be made, the base may be two dimensional e.g. made of paper, cardboard, or plastic sheet. In such case, instead of recesses for the cylinders or other solid shapes, spaces may simply be designated on the sheet and appropriately coded.

Balance case 5 and rod 7 are also preferably made of wood, but could, of course, be made of metal or plastic. Balance arm assembly 9 may also be made out of any convenient material of construction such as wood or plastic; however, it is preferably made of metal, since this renders the balance more accurate. Balance pans 22 and 22' can also be made of any of the above mentioned materials.

In the preferred embodiment of the present invention shown in the drawing the solid objects of different density are made of different metals. However, the objects may be made of different types of wood, rock, ceramic or plastic. Furthermore, the various solid shapes in the set need not all be of the same class of material, i.e. they need not all be metals but may be composed of a mixture of equal sized objects of rock, metal, wood, and plastic, etc. If the densities of the objects in a particular class of materials are too similar to be easily distinguished from each other on the balance, the objects may be loaded, as with lead shot, so that each of them has a weight significantly different from the others.

The shape of the solid objects is not important, but it is essential that each of the solid objects be of the same size and shape as every other object in the set. While cylindrical or rod shapes are preferred, because of ease of manufacture, any shape may be used, as for example, cubes, rectangular solid blocks, pie shapes, discs, etc. Balls are not preferred because they tend to roll off the balance pans, and because they have no bottom surface for convenient coding.

Coding of the solid object to match the proper space or recess on the base board is preferably done by the use of different colors. However, the coding may be done by using letters, numbers, symbols, pictures, signs and the like. If the device is intended for use by children who can read, words or even chemical symbols can be used for the coding. Since the primary purpose for coding is to render the exercise self-correcting, the code designation on the solid objects must be located on the object in such manner that it will not be visible to the child during normal performance of the experiment. The most convenient place to put the coding is on the bottom face or underside of the object.

While the preferred embodiment of the present invention shown in the drawing contains six solid objects, it should be apparent that a larger or smaller number may be used. With children of high intelligence, it appears necessary to have at least five objects to present an adequate intellectural challenge.

USE OF THE INVENTION

In order for the child to get the maximum educational benefit from the present invention he should be taught how to use it properly. The following method may be used. First, the child should be shown how to assemble the balance and then how it functions. It should be explained that the pans will balance and that the pointer will stand straight up when the pans are empty. The child should then be shown the various metal cylinders and be permitted to handle them. He should be shown that he is able to tell with his hands the difference between the lightest one and the heaviest one. He should next be shown that when the two cylinders are placed on the balance one on each pan the heavier one will sink and the lighter one will rise. Thereafter, he should be handed two cylinders of similar density, such as iron and nickel, which he will be unable to distinguish with his hands. He should now be shown that the balance is able to distinguish between their weights even though his hands cannot.

After the above has been learned by the child, he is ready to be taught how to determine the progressive order of relative weights of a set consisting of any number of cylinders. This may be done in the following manner: all the cylinders are removed from their respective recesses, being certain that the color coded surfaces are all facing down, and set to one side for example, the left side of the base board. Any two cylinders are then selected and one placed on each pan. The lighter one is then removed and set aside for example to the right side of the board. A third cylinder is then selected from among the unweighed group and placed on the empty pan to see whether it is lighter or heavier than the one which remained on the pan from the previous weighing. The lighter of the two cylinders should again be removed from the balance and also set aside, that is, to the right with the other weighed cylinders. Each of the remaining unweighed cylinders should then be similarly weighed, one at a time. Each time the lighter one is removed and set aside. After all the cylinders have thus been weighed, the last one remaining on the balance pan will be the heaviest of the cylinders in the set. This cylinder is now placed in the top recess on the base board.

The entire weighing procedure is now repeated with the remaining cylinders in the set to determine the second heaviest one. When this one has been determined, it is placed in the recess next to the heaviest one. The same procedure is now repeated a third time to find the third heaviest cylinder, which is then placed in the third recess. The same weighing procedure is then repeated with the remaining cylinders until all of them end up in the recesses on the base board. When this has been done, the child should turn the cylinders over to see whether the colors on the bottom surface match the colors of the recesses. If all the colors match, the cylinders have been arranged in the proper order of their densities. If the colors do not match, the correct order has not been found, and the entire experiment should be repeated from the beginning.

By repeated performance of the experiment the child will learn among other things, that all metals even though of the same size and shape are not of the same weight, that some metals are heavier than others, and that this relative heaviness is a characteristic of the metal called "density."

The present invention is intended to stimulate and develop the intelligence of pre-school children who are unable to read. However, it is ideally suited for all children, whether readers or not, who can find meaningful experiences by doing things with their hands. For many children at the lower elementary level with poor reading ability, the present invention can provide an educational experience with real success.

The present invention also helps to develop the child's capacity for thinking logically through his personal involvement in a child-level scientific investigation. It introduces the child to the "scientific method" by making him verify his assumptions (regarding the weight of an object) by his own experience (by weighing it). It helps the child to develop competence in the use of a balance, a basic scientific tool. In addition, it teaches the child to take a set of randomly ordered solid objects and to grade them according to their densities.

While the invention has been described and is primarily intended to be used as an aid to formalized education at the pre-school (nursery or kindergarten) or lower elementary levels, it should be understood that the invention is also eminently suited to be a scientific toy. Its use can easily be understood by a parent who can explain its proper use to the child. If intended to be used as a toy, it can be manufactured from low-cost materials such as plastics.

OPTIONAL COMPONENTS

The invention as above described is the basic study unit. This basic unit may be rendered more complex or sophisticated by the addition of various optional components. One such optional component is a set of identical weights, for example, a plurality of discs or washers. These may be made of any suitable material such as metal, wood or plastic. With these weights the child can be taught to determine the relative weight of any of the solid objects. That is, he can learn to count the number of discs required to balance (or since they will not exactly balance, to overbalance) each of the solid objects. Thus, the child is able to learn the concept of relative weight in terms of a number scale. In other words, he will learn that whereas an aluminum cylinder is balanced by 2 discs, it takes 4 to balance zinc, 5 to balance iron, etc.

Another optional component which may be added to the basic unit is a set of standard calibrated weights. With these a child can learn to obtain the exact weight of each of the solid objects. This, however, requires that the child be able to add.

Still another optional component is a set of multiple sized objects. These must be made of the same material, for example a bar of wood, which has been cut into integral multiples of size and weight. That is, pieces are cut into one-inch, two-inch, and three-inch lengths. With these the child can be taught that an object which is twice as long weighs twice as much, since it takes 2 one-inch pieces to balance 1 two-inch piece.

Yet another optional component may consist of a set of solids, each of which is the same weight as every other, but of a different material and of a different density, and consequently, of a different size. Balancing these on the scale will help to develop in the child a visual feeling for density as related to size. A variation of this optional component is to have a set of objects of materials of different density which vary in both size and weight.

The present invention, especially when used together with its optional components, contains a large number of levels of intellectual challenge within a single educational unit or kit. It can therefore be used for any age level above about age four, with each age group being able to find and master its own level of work within the kit. After mastering one level, the student can move on to the next, at his own speed.

Various modifications of the present invention, other than those described, will readily be apparent to those skilled in the art, without departing from the scope and spirit of the present invention. Consequently, it is to be understood that the present invention is not limited to the precise construction and methods described herein, these being merely illustrative of the principles and preferred embodiments of the present invention.

What is claimed is:
1. An educational device suitable for the self-corrective teaching of density of solids comprising, in combination: (1) a balance, (2) a plurality of equal-sized solid objects of different density coded in such manner as to be hidden from the view of the person using the device and to correspond with a matching coded space on a base, and (3) a base containing a plurality of spaces equal in number to the number of said solid objects, said spaces being arranged progressively in the order of the densities of said solid objects and coded to correspond with the appropriate solid object.

2. The device of claim 1 wherein all of said solid objects are made of metal.

3. The device of claim 1 wherein all of said solid objects are made of plastic.

4. The device of claim 1 wherein the solid objects are made of different classes of material.

5. The device of claim 1 wherein coding of the solid objects and the spaces on the base comprises color coding.

6. The device of claim 1 wherein: said base is made of plastic and contains recesses for said solid objects and for the parts comprising the balance, wherein said solid objects are all made of metal, and wherein the coding of said solid objects and the recesses in the base comprises color coding.

References Cited
UNITED STATES PATENTS

| | | | |
|---|---|---|---|
| 2,623,303 | 12/1952 | Mindel | 35—22.5 |
| 2,659,163 | 11/1953 | Albee | 35—22.5X |

FOREIGN PATENTS

| | | | |
|---|---|---|---|
| 701,982 | 1/1954 | Great Britain | 35—22.5 |

OTHER REFERENCES

Dr. Montessori's Own Handbook, copyright 1914, Frederick Stokes Publishers, pp. 28, 29, 30, 37, 40, 41, Figs. 5–7, 13–15.

Chicago Apparatus Co., Catalogue 55, September 1954, pp. 60, 61 only.

Welch Scientific Co., Scientific Apparatus and Supplies Catalogue, Oct. 25, 1965, p. 14 only.

C. H. Stoelting Co., p. 52.

Welch Scientific Co., Oct. 25, 1965 Catalogue, p. 124.

HARLAND S. SKOGQUIST, Primary Examiner